United States Patent
Saintigny et al.

(10) Patent No.: US 10,329,406 B2
(45) Date of Patent: Jun. 25, 2019

(54) EPOXIDIZED RUBBER COMPOSITIONS

(71) Applicants: Compagnie Generale des Etablissements Michelin, Clermont-Ferrand (FR); Xavier Saintigny, Greenville, SC (US); Jessica McDowell, Greenville, SC (US)

(72) Inventors: Xavier Saintigny, Greenville, SC (US); Jessica McDowell, Greenville, SC (US)

(73) Assignee: Compagnie Generale des Etablissements Michelin, Clermont-Ferrand (FR)

(*) Notice: Subject to any disclaimer, the term of this patent is extended or adjusted under 35 U.S.C. 154(b) by 0 days.

(21) Appl. No.: 15/539,977

(22) PCT Filed: Dec. 28, 2015

(86) PCT No.: PCT/US2015/067659
§ 371 (c)(1),
(2) Date: Jun. 26, 2017

(87) PCT Pub. No.: WO2016/106416
PCT Pub. Date: Jun. 30, 2016

(65) Prior Publication Data
US 2017/0369680 A1    Dec. 28, 2017

Related U.S. Application Data

(60) Provisional application No. 62/096,923, filed on Dec. 26, 2014.

(51) Int. Cl.
| | |
|---|---|
| C08K 5/548 | (2006.01) |
| C08K 3/36 | (2006.01) |
| C08K 5/372 | (2006.01) |
| C08L 15/00 | (2006.01) |
| C08C 19/06 | (2006.01) |
| C08K 3/04 | (2006.01) |
| C08K 3/06 | (2006.01) |
| C08K 3/22 | (2006.01) |
| C08K 5/103 | (2006.01) |
| C08K 5/18 | (2006.01) |
| C08K 5/31 | (2006.01) |
| C08K 5/47 | (2006.01) |
| C08L 45/02 | (2006.01) |
| C08L 47/00 | (2006.01) |
| C08L 91/06 | (2006.01) |

(52) U.S. Cl.
CPC ........... *C08K 5/548* (2013.01); *C08K 3/04* (2013.01); *C08K 3/06* (2013.01); *C08K 3/22* (2013.01); *C08K 3/36* (2013.01); *C08K 5/103* (2013.01); *C08K 5/18* (2013.01); *C08K 5/31* (2013.01); *C08K 5/372* (2013.01); *C08K 5/47* (2013.01); *C08L 15/00* (2013.01); *C08L 45/02* (2013.01); *C08L 47/00* (2013.01); *C08L 91/06* (2013.01); *C08C 19/06* (2013.01)

(58) Field of Classification Search
CPC . C08K 5/548; C08K 5/372; C08K 3/36; C08J 3/24; C08J 2309/00; C08J 2461/00; C08J 2445/02; C08C 19/06
See application file for complete search history.

(56) References Cited

U.S. PATENT DOCUMENTS

| | | | |
|---|---|---|---|
| 6,774,255 B1 * | 8/2004 | Tardivat | C07F 7/0836 528/30 |
| 7,488,768 B2 * | 2/2009 | Tardivat | B60C 1/0016 152/209.1 |
| 2005/0148713 A1 * | 7/2005 | Labauze | B60C 1/0016 524/311 |
| 2011/0190416 A1 * | 8/2011 | Maesaka | B60C 1/0016 523/155 |
| 2012/0175033 A1 * | 7/2012 | Lavialle | B60C 9/18 152/526 |

FOREIGN PATENT DOCUMENTS

EP    2105462 B1    9/2009

OTHER PUBLICATIONS

International Search Report with Written Opinion, dated Mar. 31, 2016.

* cited by examiner

Primary Examiner — Robert D Harlan
(74) Attorney, Agent, or Firm — Frank J. Campigotto

(57) ABSTRACT

Rubber compositions and articles made from such rubber compositions that are based upon a cross-linkable elastomer composition, the cross-linkable elastomer composition comprising, per 100 parts by weight of rubber (phr) between 70 phr and 100 phr of an epoxidized rubber component selected from an epoxidized polybutadiene rubber (eBR), an epoxidized styrene-butadiene rubber (eSBR), or combinations thereof, wherein the epoxidized rubber component has a Tg of between −80° C. and −110° C. and an epoxy-function content of between 1 mol % and 25 mol %. Such rubber compositions may further include between 30 phr and 150 phr of a plasticizing resin, silica and a coupling agent that is a monohydroxysilane polysulfide having a form (Formula I) wherein radicals R, identical or different, are hydrocarbon groups, radicals R', identical or different, are divalent linking groups and x is equal to or greater than 2.

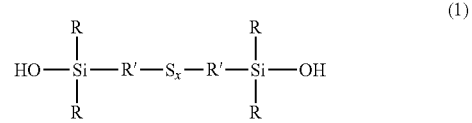

(1)

20 Claims, 1 Drawing Sheet

EPOXIDIZED RUBBER COMPOSITIONS

This application claims the benefit of U.S. provisional application 62/096,923 filed Dec. 26, 2014, which is hereby fully incorporated by reference.

BACKGROUND OF THE INVENTION

Field of the Invention

This invention relates generally to rubber compositions and more particularly, to rubber compositions useful for making articles such as tires or semi-finished products for tires and such articles.

Description of the Related Art

Tire designers must often deal with conflicting requirements when they design a new tread for a tire. Tire consumers want to have tires that grip well in the snow as well as on dry and wet roads, they want low rolling resistance tires that require tires be designed with low hysteresis and they want tires with good wear properties so they can run the tires for many miles without wearing them out.

Improving grip and wear at the same time remains a constant challenge to the tire designer. It is well known in the industry that tire designers often compromise on certain tire performance characteristics since often each improvement to one characteristic is offset by a decline in another tire performance characteristic. Such is the case for tire wear and wet traction. There is a compromise that tire designers must reach since when they try to achieve an improvement in the wear properties of the tire there is often a decrease in the braking performance of the tire. Therefore, tire designers are looking for improvements to their designs that allow them to break this compromise, i.e., achieve an improvement in wear without a corresponding decrease in another tire property such as braking.

Sometimes the improvements to the physical properties of rubber compositions can be obtained by improving the incorporation of components in the mix. As is known, mixing the rubber components in a rubber composition can be difficult due to the interaction of the components during the mixing process. Therefore designers are looking for improvements to the rubber compositions that can be achieved by changing the mixing process or the ingredients the rubber composition that will improve the dispersion of the material in the rubber composition.

SUMMARY OF THE DISCLOSURE

Particular embodiments of the disclosure include rubber compositions and articles made from the rubber compositions. Embodiments include rubber compositions that are based upon a cross-linkable elastomer composition, the cross-linkable elastomer composition comprising, per 100 parts by weight of rubber (phr) between 70 phr and 100 phr of an epoxidized rubber component selected from an epoxidized polybutadiene rubber (eBR), an epoxidized styrene-butadiene rubber (eSBR), or combinations thereof, wherein the epoxidized rubber component has a Tg of between −80° C. and −110° C. and an epoxy-function content of between 1 mol % and 25 mol %.

Such rubber compositions may further include between 30 phi and 150 phr of a plasticizing resin, silica and a coupling agent that is a monohydroxysilane polysulfide having a form

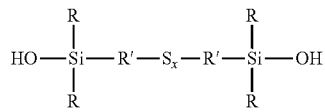

wherein radicals R, identical or different, are hydrocarbon groups, radicals R', identical or different, are divalent linking groups and x is equal to or greater than 2.

Examples of the coupling agent include bis(3-hydroxydimethylsilyl)propyl tetrasulfide, bis(3-hydroxydimethylsilyl)propyl disulfide, bis(2-hydroxy-dimethylsilyl)ethyl tetrasulfide, bis(2-hydroxydimethylsilyl)ethyl disulfide, or combinations thereof.

DETAILED DESCRIPTION OF PARTICULAR EMBODIMENTS

Figure 1A:
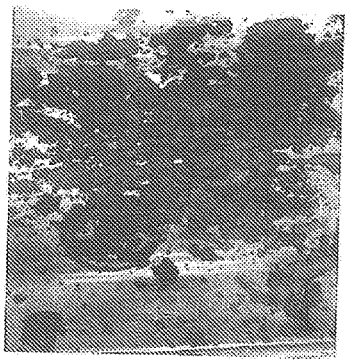
FIGS. 1A-1B are depictions of exemplary rubber mixtures showing the improved processability with a monohydroxysilane polysulfide silica coupling agent.

Particular embodiments of the present invention include treads and tires having such treads that have improved wear characteristics while maintaining or even improving their traction, i.e., improved braking performance, especially wet traction. This improvement in wear and traction has been achieved by forming unique tire treads from a silica reinforced rubber composition that includes a rubber component having a low glass transition temperature (Tg), a plasticizing resin and a monohydroxysilane polysulfide silica coupling agent. The plasticizing resin is added to adjust the Tg of the rubber composition to be within a range suitable for all-weather tires, summer tires and/or winter tires. The monohydroxysilane polysulfide coupling agent vastly improves the processability of the rubber composition as well as the dispersion of the silica in the rubber composition and further provides improvement in the physical characteristics of the rubber composition, especially related to cohesive properties.

Such tires are particularly suitable for use on passenger cars and/or light trucks and while certain embodiments are limited to such uses, other embodiments are broader and may include tires useful for other vehicles including heavy trucks, aircraft and so forth.

As used herein, "phr" is "parts per hundred parts of rubber by weight" and is a common measurement in the art wherein components of a rubber composition are measured relative to the total weight of rubber in the composition, i.e., parts by weight of the component per 100 parts by weight of the total rubbers) in the composition.

As used herein, elastomer and rubber are synonymous terms.

As used herein, "based upon" is a term recognizing that embodiments of the present invention are made of vulcanized or cured rubber compositions that were, at the time of their assembly, uncured. The cured rubber composition is therefore "based upon" the uncured rubber composition. In other words, the cross-linked rubber composition is based upon or comprises the constituents of the cross-linkable rubber composition.

As is generally known, a tire tread includes the road-contacting portion of a vehicle tire that extends circumferentially about the tire. It is designed to provide the handling characteristics required by the vehicle; e.g., traction, dry braking, wet braking, cornering and so forth—all preferably being provided with a minimum amount of generated noise and at low rolling resistance.

Treads of the type disclosed herein include tread elements, the structural features of the tread that contact the ground. Such structural features may be of any type or shape, examples of which include tread blocks and tread ribs. Tread blocks have a perimeter defined by one or more grooves that create an isolated structure in the tread while a rib runs substantially in the longitudinal (circumferential) direction and is not interrupted by grooves that run in the substantially lateral (axial) direction or any other grooves that are oblique thereto. The radial (depth) direction is perpendicular to the lateral direction.

It is recognized that treads may be formed from only one rubber composition or in two or more layers of differing rubber compositions, e.g., a cap and base construction. In a cap and base construction, the cap portion of the tread is made of one rubber composition that is designed for contract with the road. The cap is supported on the base portion of the tread, the base portion made of different rubber composition. In particular embodiments of the present invention the entire tread may be made from the rubber compositions disclosed herein while in other embodiments only the cap portions of the tread may be made from such rubber compositions.

In other embodiments it is recognized that the contact surface of the tread elements, i.e., that portion of the tread element that contacts the road, may be formed totally and/or only partially from the rubber compositions disclosed herein. In particular embodiments the tread block, for example, may be formed as a composite of laterally layered rubber compositions such that at least one lateral layer of a tread block is of the rubber compositions disclosed herein and another lateral layer of a tread block is of an alternative rubber composition. In particular embodiments of tread constructions, at least 80% of the total contact surface area of the tread is formed solely from the rubber compositions disclosed herein. The total contact surface area of the tread is the total surface area of all the radially outermost faces of the tread elements that are adapted for making contact with the road.

Particular embodiments of the rubber compositions that are disclosed herein and that are useful for treads include an epoxidized rubber component that is selected from an epoxidized polybutadiene rubber (eBR), an epoxidized styrene-butadiene rubber (eSBR) or combinations thereof. These useful rubbers may be further characterized as having a low glass transition temperature (Tg), i.e., a Tg of between −80° C. and −110° C. or alternatively between −80° C. and −105° C., between −85° C. and −105° C. or between −90° C. and −100° C. The glass transition temperatures of epoxidized elastomers may be measured by differential scanning calorimetry (DSC) in accordance with ASTM D3418.

Epoxidized rubbers such as eBR and eSBR are well known and may be obtained, as is known to those skilled in the art, by processes based on chlorohydrin or bromohydrin or processes based on hydrogen peroxides, alkyl hydroperoxides or peracids (such as peracetic acid or performic acid).

To obtain the targeted technical effect, the epoxidized rubber includes between 1 mol % and 25 mol % of the epoxy functionality or alternatively between 2 mol % and 25 mol %, between 2 mol % and 18 mol %, between 5 mol % and 2.5 mol %, between 5 mol % and 18 mol %, between 8 mol % and 15 mol % or between 8 mol % and 20 mol %. Since the Tg of the rubber increases with increasing epoxy functionality, greater than 25 mol % impacts the desired wear properties of the treads disclosed herein and less than the 1 mol % impacts the resin selection and content of the resulting rubber composition. The epoxy functionality by mole percent can be determined in known way through NMR analysis.

eSBR is a copolymer of styrene and butadiene that has been functionalized with an epoxy functional group as explained above. The SBR may be manufactured by any of the known processes including the emulsion process producing E-SBR and the solution process producing S-SBR.

The microstructure of the eSBR is typically described in terms of the amount of bound styrene and the form of the butadiene portion of the polymer. Looking first at the amount of bound styrene, since the Tg of the eSBR increases as the bound styrene content increases it is necessary to limit the amount of bound styrene to an amount that still provides the required low Tg of the elastomer. Particular embodiments of the present invention may utilize an SBR having a bound styrene content, for example, of between 3 wt % and 30 wt % or alternatively between 3 wt % and 25 wt % or between 5 wt % and 20 wt % bound styrene.

Considering the butadiene portion of the copolymer, the butadiene portion is made up of three forms because of the double bond present in that butadiene portion. The three forms are the cis-1,4, trans-1,4 and vinyl-1,2 forms. Higher levels of the cis-form may typically provide a lower Tg while increasing levels of the vinyl-form may typically increase the Tg. SBR materials suitable for use as the low Tg SBR may be described, for example, as having a vinyl-1,2-bond content of between 4 mol % and 30 mol % or alternatively, between 4 mol % and 25 mol % or between 4 mol % and 20 mol %.

Of course it is a balancing of the styrene content and the microstructure of the butadiene portion of the eSBR that provides the physical properties desired of the material, including the low Tg. While the microstructure and styrene content of the eSBR can be adjusted to provide improvements to the properties of the elastomer, the invention requires that the low Tg eSBR elastomers that are included in the suitable rubber compositions disclosed herein fall reasonably within the claimed glass transition range.

eBR is a homopolymer of butadiene units that have polymerized and that has then been functionalized with an epoxy functional group as explained above. As in the case of the butadiene portion of the eSBR, the eBR Tg decreases with increased levels of the cis-form microstructure and increases with increased levels of the vinyl-form. In particular embodiments, for example, the cis-form content of the eBR is in excess of 50 mol %. While the microstructure of the eBR can be adjusted to provide improvements to the properties of the elastomer, the invention requires that the low Tg eBR elastomers that are included in the suitable rubber compositions disclosed herein fall within the claimed glass transition range.

Particular embodiments of the suitable rubber compositions useful for tire treads disclosed herein include between 70 phr and 100 phr of the low Tg epoxidized rubber component. Alternatively the rubber compositions may include between 80 phr and 100 phr of the low Tg epoxidized rubber component, between 85 phr and 100 phr, between 90 phr and 100 phr or greater than 90 phr of the rubber component. Particular embodiments may include less than 100 phr of the low Tg epoxidized rubber component such as between 80 phr and 95 phr, between 85 phr and 95 phr or between 90 phr and 95 phr. Particular embodiments include 100 phr of the low Tg epoxidized rubber component.

Particular embodiments of the suitable rubber compositions disclosed herein may include as the low Tg epoxidized rubber component only eBR, only eSBR or combinations of both eBR and SBR in any ratio. In those embodiments that include both eBR and eSBR, some embodiments may be limited to including eBR in a majority amount or alternatively in amount greater than 60% of the total phr of the eBR and the SBR in the rubber composition or at least 75% or at least 90% of such total phr.

In addition to the low Tg epoxidized eBR and/or eSBR, particular embodiments of the rubber compositions disclosed herein may include one or more additional diene rubber components. Such diene elastomers are understood to be those elastomers resulting at least in part, i.e., a homopolymer or a copolymer, from diene monomers, i.e., monomers having two double carbon-carbon bonds, whether conjugated or not.

While particular embodiments of the rubber compositions disclosed herein include only the low Tg epoxidized rubber components discussed above, others may additionally include such diene elastomers capped at an amount of no more than 30 phr or alternatively, no more than 25 phr, no more than 20 phr, no more than 10 phr or no more than 5 phr of such additional diene elastomers. Particular embodiments of such rubber compositions may include a lower limit for each of these caps of 0 phr and others may include a lower limit of 5 phr of such additional diene elastomers.

These additional diene elastomers may be classified as either "essentially unsaturated" diene elastomers or "essentially saturated" diene elastomers. As used herein, essentially unsaturated diene elastomers are diene elastomers resulting at least in part from conjugated diene monomers, the essentially unsaturated diene elastomers having a content of such members or units of diene origin (conjugated dienes) that is at least 15 mol. %. Within the category of essentially unsaturated diene elastomers are highly unsaturated diene elastomers, which are diene elastomers having a content of units of diene origin (conjugated diene) that is greater than 50 mol. %.

Those diene elastomers that do not fall into the definition of being essentially unsaturated are, therefore, the essentially saturated diene elastomers. Such elastomers include, for example, butyl rubbers and copolymers of dienes and of alpha-olefins of the EPDM type. These diene elastomers have low or very low content of units of diene origin (conjugated dienes), such content being less than 15 mol. %.

Particular embodiments of the present invention exclude any additional diene elastomers that are essentially saturated.

Suitable elastomers that may be included as additional elastomers in the rubber compositions disclosed herein in addition to the eBR and eSBR include, for example, one or more highly unsaturated elastomers such as polybutadienes (BR), polyisoprenes (IR), natural rubber (NR), butadiene copolymers, isoprene copolymers and mixtures of these elastomers. Such copolymers include, for example, butadiene/styrene copolymers (SBR), isoprene/butadiene copolymers (BIR), isoprene/styrene copolymers (SIR) and isoprene/butadiene/styrene copolymers (SBIR). Particular embodiments of the present invention are limited only to highly unsaturated diene elastomers as useful additional elastomers.

In addition to the elastomers described above, particular embodiments of the present invention include a plasticizing resin and in particular embodiments the resin is an efficient plasticizing resin. An efficient plasticizing resin is one that when mixed in an amount of 67 phr with just the low Tg epoxidized rubber component, results in a mixture having a Tg that is at least 14° C. higher than the Tg of the epoxidized rubber component. Such plasticizing resins are typically compatible with the rubber composition; that is, they are miscible with the rubber composition. If the plasticizing resin is not compatible, then a determination of the Tg using DSC in accordance with ASTM D3418 will have Tg peaks representing the rubber blend as well as the resin itself. If the resin is compatible, then there will be but one peak for the rubber composition.

Table 1 demonstrates how some plasticizing resins are efficient plasticizing resins for some levels of epoxy functionality but not at others. Some are not efficient plasticizing resins with BR having no epoxy functionality but become efficient with at least some of the epoxy functionality levels.

For example, as may be seen in Table 1, the Oppera plasticizer (modified aliphatic hydrocarbon resin available from ExxonMobil) is demonstrated as an efficient resin only when mixed with the BR having 12.5 mol % epoxy functionality and not with the nonfunctionalized BR nor with the 20 mol % functionalization. BPH is the well-known antioxidant 2,2'-methylene-bis(4-methyl-6-tert-butyl)-phenol and is a useful efficient plasticizing resin at least for the BR having the 12.5 mol % epoxy functionality.

Other useful efficient plasticizing resins include the SYL-VARES 600 resin ($M_n$ 850 g/mol; Ip 1.4; $T_g$ 47° C.; HN of 31 mg KOH/g) that is an octyl phenol-modified copolymer of styrene and alpha methyl styrene as well as the coumarone-indene resins.

TABLE 1

Change in Tg of BR at Various Epoxy Functionality Levels

| Plasticizer | | | Change in Tg of BR Mixture with 67 phr of Plasticizer, ° C. | | | |
| --- | --- | --- | --- | --- | --- | --- |
| Name | Type | Tg, ° C. | 0 mol % X | 5 mol % X | 12.5 mol % X | 20 mol % X |
| BPH | antioxidant | 16 | | | 18 | 21 |
| C30 | Coumarone-Indene | −16 | | | 19 | |
| Colophane | Pine rosin | 52 | | 12 | 19 | |
| Dertophene 1510 | Terpene Phenolic | 108 | | 23 | 31 | |
| Dertophene H150 | Terpene Phenolic | 74 | 4 | 16 | 38 | 34 |
| Dertophene T115 | Terpene Phenolic | 74 | | 16 | 18 | |
| Dertophene T135 | Terpene Phenolic | 85 | | | 23 | |
| Escorez 5690 | Cycloaliphatic | 38 | 14 | | | |
| Oppera | Hydrocarbon Resin | 44 | 12 | | 14 | 3 |
| Resin- OPFT | Octylphenol formaldehyde | 52 | | 9 | 17 | |

TABLE 1-continued

Change in Tg of BR at Various Epoxy Functionality Levels

| Plasticizer | | | Change in Tg of BR Mixture with 67 phr of Plasticizer, ° C. | | | |
|---|---|---|---|---|---|---|
| Name | Type | Tg, ° C. | 0 mol % X | 5 mol % X | 12.5 mol % X | 20 mol % X |
| Sylvares 600 | AMS phenolic | 47 | | | 20 | |
| Sylvares TP2019 | Terpene Phenolic | 74 | 12 | 19 | 17 | |
| Sylvares TP2040 | Terpene Phenolic | 74 | 4 | 15 | 36 | 36 |
| Sylvares TP300 | Terpene Phenolic | 68 | | | 35 | 32 |
| Sylvatac RE40 | Terpene Phenolic | −5 | | 10 | 15 | |
| Uni-Rez TP115 | polyamide | 64 | | 14 | 20 | |

As may be noted, the terpene phenolic resins are especially useful as a class for providing efficient plasticizing resins. Terpene phenolic resins are well known and are produced by the copolymerization of terpene monomers and phenol. As is known, terpene monomers include alpha-pinene, beta-pinene and limonene monomers, with the limonene monomers existing in three possible isomers: L-limonene (laevorotatory enantiomer), D limonene (dextrorotatory enantiomer) or else dipentene, the racemate of the dextrorotatory and laevorotatory enantiomers. Useful terpene phenolic resins may be those that include the copolymerization of the monomers selected from alpha-pinene, beta-pinene, limonene monomers or combinations thereof with phenol. These types of resins are sometimes known as phenol modified terpene resins.

The degree of polarity of the terpene phenolic resins is determined by the number of hydroxyl groups contained within the resin. The higher the hydroxyl content, the greater the polarity of the terpene phenolic resin. The hydroxyl number (HN) of the resin is the amount, in milligrams, of potassium hydroxide equivalent to the hydroxyl groups in a 1 g sample of the resin and is, therefore, a measure of the concentration of hydroxyl groups in the resin. It is determined in known manner in accordance with ASTM E222. Particular embodiments have resins having a hydroxyl number that is at least 30 mg KOH/g or alternatively at least 50 mg KOH/g.

Terpene phenolic resins are available on the market from, for example, Arizona Chemical having offices in Savannah, Ga. Arizona Chemical markets a range of terpene phenolic resins under the name SYLVARES with varying softening points (SP), glass transition temperatures (Tg) hydroxyl numbers (HN), number-average molecular masses (Mn) and polydispersity indices (Ip), examples of which include: SYLVARES TP105 (SP: 105° C.; Tg: 55° C.; HN: 40; Mn: 540; Ip: 1.5); SYLVARES TP115 (SP: 115° C.; Tg: 55° C.; HN: 50; Mn: 530; Ip: 1.3); and SYLVARES TP2040 (SP: of 125° C.; Tg: 74° C.; HN: 141-160; Mn: 608; Ip: 1.3).

Particular embodiments of the useful rubber compositions disclosed herein may include between 30 phr and 150 phr or between 40 phr and 150 phr of the efficient plasticizing resin or alternatively between 50 phr and 150 phr or between 60 phr and 100 phr of the resin. In particular embodiments the amount of efficient plasticizing resin that is added is an amount that adjusts the glass transition temperature of the final rubber composition to between −35° C. and 0° C. as may be desired for the a tread designed for a particular season. For example the efficient resin may be added in an amount sufficient to adjust the Tg of the rubber compositions around the broad range mentioned above to provide a Tg of between −35° C. and −25° C. for winter tires, between −30° C. and −17° C. for all-season tires and between −17° C. and 0° C. for summer tires.

It is recognized that in some rubber compositions that include the eBR and/or the eSBR, the amount of the efficient resin added to the rubber composition may result in the Tg of the rubber composition being higher than the target for the particular use. Therefore, in particular embodiments, an additional plasticizer other than an efficient plasticizing resin may be used to lower the Tg to the target or to adjust another performance characteristic for the tread to be formed from the rubber composition. Such plasticizers may include other resins or may include a plasticizing oil as are well known to those having ordinary skill in the art. Such additional plasticizer may be added in an amount of between 0 phr and 40 phr or alternatively between 1 phr and 30 phr or between 5 phr and 15 phr.

In addition to the elastomers, the efficient plasticizing resins and other plasticizers disclosed above, particular embodiments of the rubber compositions that are useful for treads disclosed herein may further include a reinforcing filler. Reinforcing fillers are added to rubber compositions to, inter alia, improve their tensile strength and wear resistance. Any suitable reinforcing filler may be suitable for use in compositions disclosed herein including, for example, carbon blacks and/or inorganic reinforcing fillers such as silica, with which a coupling agent is typically associated.

It should be noted that particular embodiments of the rubber compositions disclosed herein may include no carbon black or alternatively, very little carbon black such as, for example, between 0.5 phr and 15 phr of carbon black or between 0.5 phr and 10 phr of carbon black. Carbon black in typically added at these low levels to provide the black color to the rubber compositions. For those embodiments that contain carbon black, suitable carbon blacks include, for example, those of the type HAF, ISAF and SAF, conventionally used in tires. Reinforcing blacks of ASTM grade series 100, 200 and/or 300 are suitable such as, for example, the blacks N115, N134, N234, N330, N339, N347, N375 or alternatively, depending on the intended application, blacks of higher ASTM grade series such as N660, N683 and N772.

Inorganic reinforcing fillers include any inorganic or mineral fillers, whatever its color or origin (natural or synthetic), that are capable without any other means, other than an intermediate coupling agent, of reinforcing a rubber composition intended for the manufacture of tires. Such inorganic reinforcing fillers can replace conventional tire-grade carbon blacks, in whole or in part, in a rubber composition intended for the manufacture of tires. Typically such fillers may be characterized as having the presence of hydroxyl (—OH) groups on its surface.

Inorganic reinforcing fillers may take many useful forms including, for example, as powder, microbeads, granules, balls and/or any other suitable form as well as mixtures thereof. Examples of suitable inorganic reinforcing fillers include mineral fillers of the siliceous type, such as silica ($SiO_2$), of the aluminous type, such as alumina ($AlO_3$) or combinations thereof.

Useful silica reinforcing fillers known in the art include fumed, precipitated and/or highly dispersible silica (known as "HD" silica). Examples of highly dispersible silicas include Ultrasil 7000 and Ultrasil 7005 from Degussa, the silicas Zeosil 1165MP, 1135MP and 1115MP from Rhodia, the silica Hi-Sil EZ150G from PPG and the silicas Zeopol 8715, 8745 and 8755 from Huber. In particular embodiments, the silica may have a BET surface area, for example, of between 60 $m^2/g$ and 400 $m^2/g$ or alternatively between 80 $m^2/g$ and 300 $m^2/g$.

For coupling the inorganic reinforcing filler to the diene elastomer, a coupling agent that is at least bifunctional provides a sufficient chemical and/or physical connection between the inorganic reinforcement filler and the diene elastomer. Examples of such coupling agents include bifunctional organosilanes or polyorganosiloxanes. Such coupling agents and their use are well known in the art. The coupling agent may optionally be grafted beforehand onto the diene elastomer or onto the inorganic reinforcing filler as is known. Otherwise it may be mixed into the rubber composition in its free or non-grafted state. One useful coupling agent is X50-S, a 50-50 blend by weight of Si69 (the active ingredient, bis-(triethoxysilylpropyl) tetrasulfide, abbreviated to TESPT) and N330 carbon black, available from Evonik. Another useful example of silane polysulfides useful as coupling agents include bis-(triethoxysilylpropyl) disulfide, abbreviated to TESPD.

For those rubber compositions using coupling agents such as TESPT or TESPD or similar types, the coupling agent may be included at any suitable amount for the given application, examples of which are between 2 phr and 20 phr or alternatively, between 2 phr and 15 phr or between 4 phr and 12 phr. It is generally desirable to minimize its use. In particular embodiments, the amount of coupling agent may represent between 0.5 wt % and 15 wt % relative to the total weight of the silica filler. In the case for example of tire treads for passenger vehicles, the coupling agent may be less than 12 wt % or even less than 8 wt % relative to the total weight of the silica filler.

In particular embodiments, the silica coupling agent is limited to a monohydroxysilane polysulfide silica coupling agent having the form

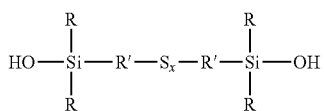

wherein radicals R, identical or different, are hydrocarbon groups, radicals R', identical or different, are divalent linking groups and x is equal to or greater than 2. It has been found that using this coupling agent provides improved processability of the rubber composition as well as improved dispersion of the silica in the rubber composition, cohesiveness properties and improved wear.

This coupling agent is known and its various forms and methods of making are fully disclosed in U.S. Pat. No. 6,774,255, which is fully incorporated herein by reference.

In particular embodiments the useful coupling agent may include the radical R as having between 1 and 15 carbon atoms and/or the radical R' having between 1 and 18 carbon atoms. More particularly certain embodiments may provide that the radical R be selected, for example, from among $C_1$-$C_6$ alkyls, $C_5$-$C_8$ cycloalkyls and the phenyl radical and/or the radical R be selected, for example, from among $C_1$-$C_{18}$ alkylenes and $C_6$-$C_{12}$ arylenes. As is known, alkyl groups are of the general formula $C_nH_{2n+1}$ while alkylene groups may be derived from an alkyl group by removal of two hydrogen atoms from different carbon atoms and arylenes may be derived from an aromatic hydrocarbon by removal of two hydrogen atoms from different carbon atoms.

In particular embodiments, the radicals R may be selected from $C_1$-$C_3$ alkyls and the radicals R' are selected from $C_1$-$C_4$ alkylenes. In particular embodiments x may be between 2 and 9 or alternatively between 2 and 4. Examples of useful coupling agents include from bis(3-hydroxydimethylsilyl)propyl tetrasulfide, bis(3-hydroxydimethylsilyl)propyl disulfide, bis(2-hydroxy-dimethylsilyl)ethyl tetrasulfide, bis(2-hydroxydimethylsilyl)ethyl disulfide. Useful coupling agents may be used singly or in combination with others. Particular embodiments may limit the useful coupling agent to bis(3-hydroxydimethylsilyl)propyl tetrasulfide.

Figure 1B:
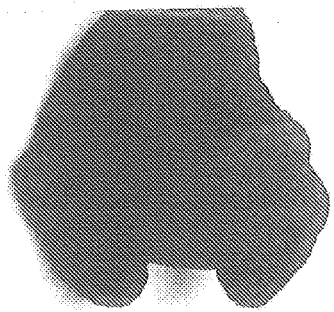

The epoxidized rubber compositions disclosed herein are difficult to process and surprising the monohydroxysilane polysulfide silica coupling agent vastly improves the processability of the rubber compositions. FIGS. 1A-1B are depictions of exemplary rubber mixtures showing the improved processability with a monohydroxysilane polysulfide silica coupling agent. The rubber compositions in these figures were the same except that the rubber composition shown in FIG. 1A included TESPT as the coupling agent while the rubber composition shown in FIG. 1B included the silol bis(3-hydroxydimethylsilyl)propyl tetrasulfide as the coupling agent. While the rubber composition with the TESPT is crumbly after being dropped from a Banbury mixer, the rubber composition with the silol is pliable.

Figure 2A:
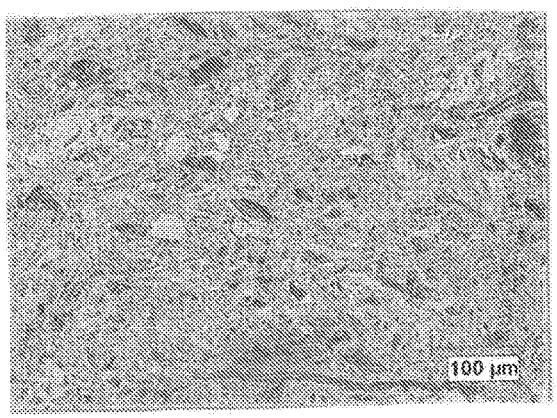
FIGS. 2A-2B are photomicrographs of exemplary rubber mixtures showing the improved silica dispersion with a monohydroxysilane polysulfide silica coupling agent.
Figure 2B:
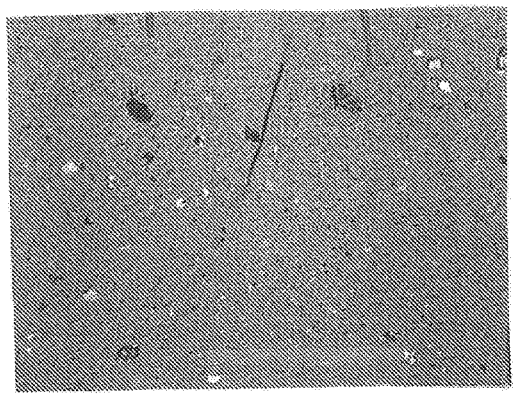

FIGS. 2A-2B are photomicrographs of exemplary rubber mixtures showing the improved silica dispersion with a monohydroxysilane polysulfide silica coupling agent. These figures are photomicrographs of the rubber compositions shown in FIGS. 1A-1B. FIG. 2A illustrates that the silica is much less well dispersed than that shown in FIG. 2B. The use of the silol greatly improved the dispersion of the silica throughout the rubber composition.

For those embodiments of the rubber compositions disclosed herein that include the monohydroxysilane polysulfide silica coupling agent, the coupling agent may be included at any suitable amount for a given application, examples of which are between 2 phr and 16 phr or alternatively between 3 phr and 15 phr, between 3 phr and 12 phr or between 3 phr and 10 phr. In particular embodiments the amount of the monohydroxysilane polysulfide silica coupling agent may be between 0.5 wt % and 14 wt % of relative to the total weight of the silica filler or alternatively between 2 wt % and 10 wt % or between 4 wt % and 8 wt %.

In particular embodiments, the amount of total reinforcing filler (carbon black (if used) and/or reinforcing inorganic filler) may include any suitable amount for the given application, examples of which are between 40 phr and 180 phr or alternatively between 50 phr and 150 phr, between 50 phr and 130 phr, between 50 phr and 110 phr or between 60 phr and 120 phr of reinforcing filler.

The rubber compositions disclosed herein may be cured with any suitable curing system including a peroxide curing system or a sulfur curing system. Particular embodiments are cured with a sulfur curing system that includes free sulfur and may further include, for example, one or more of accelerators, stearic acid and zinc oxide. Suitable free sulfur includes, for example, pulverized sulfur, rubber maker's sulfur, commercial sulfur, and insoluble sulfur. The amount of free sulfur included in the rubber composition is not limited and may range, for example, between 0.4 phr and 10 phr or alternatively between 0.4 phr and 5 phr or between 0.5 phr and 2 phr. Particular embodiments may include no free sulfur added in the curing system but instead include sulfur donors.

Accelerators are used to control the time and/or temperature required for vulcanization and to improve the properties of the cured rubber composition. Particular embodiments of the present invention include one or more accelerators. One example of a suitable primary accelerator useful in the present invention is a sulfenamide. Examples of suitable sulfenamide accelerators include n-cyclohexyl-2-benzothiazole sulfenamide (CBS), N-tert-butyl-2-benzothiazole Sulfenamide (TBBS), N-Oxydiethyl-2-benzthiazolsulfenamid (MBS) and N'-dicyclohexyl-2-benzothiazolesulfenamide (DCBS). Combinations of accelerators are often useful to improve the properties of the cured rubber composition and the particular embodiments include the addition of secondary accelerators.

Particular embodiments may include as a secondary accelerant the use of a moderately fast accelerator such as, for example, diphenylguanidine (DPG), triphenyl guanidine (TPG), diorthotolyl guanidine (DOTG), o-tolylbigaunide (OTBG) or hexamethylene tetramine (HMTA).

Without limiting the invention, such accelerators may be added in an amount of up to 5 phr, between 0.5 and 4 phr, between 0.5 and 2.5 phr or between 1 and 4.5 phr. Particular embodiments may exclude the use of fast accelerators and/or ultra-fast accelerators such as, for example, the fast accelerators: disulfides and benzothiazoles; and the ultra-accelerators: thiurams, xanthates, dithiocarbamates and dithiophosphates.

Other additives can be added to the rubber compositions disclosed herein as known in the art. Such additives may include, for example, some or all of the following: antidegradants, antioxidants, fatty acids, waxes, stearic acid and zinc oxide. Examples of antidegradants and antioxidants include 6PPD, 77PD, IPPD and TMQ and may be added to rubber compositions in an amount, for example, of from 0.5 phr and 5 phr. Zinc oxide may be added in an amount, for example, of between 1 phr and 6 phi or alternatively, of between 1.5 phi and 4 phi. Waxes may be added in an amount, for example, of between 0.5 phr and 5 phr.

The rubber compositions that are embodiments of the present invention may be produced in suitable mixers, in a manner known to those having ordinary skill in the art, typically using two successive preparation phases, a first phase of thermo-mechanical working at high temperature, followed by a second phase of mechanical working at lower temperature.

The first phase of thermo-mechanical working (sometimes referred to as "nonproductive" phase) is intended to mix thoroughly, by kneading, the various ingredients of the composition; with the exception of the vulcanization system. It is carried out in a suitable kneading device, such as an internal mixer or an extruder, until, under the action of the mechanical working and the high shearing imposed on the mixture, a maximum temperature generally between 110° C. and 190° C., more narrowly between 130° C. and 170° C., is reached.

After cooling of the mixture, a second phase of mechanical working is implemented at a lower temperature. Sometimes referred to as "productive" phase, this finishing phase consists of incorporating by mixing the vulcanization (or cross-linking) system (sulfur or other vulcanizing agent and accelerator(s)), in a suitable device, for example an open mill. It is performed for an appropriate time (typically between 1 and 30 minutes, for example between 2 and 15 minutes) and at a sufficiently low temperature lower than the vulcanization temperature of the mixture, so as to protect against premature vulcanization.

The rubber composition can be formed into useful articles, including treads for use on vehicle tires. The treads may be formed as tread bands and then later made a part of a tire or they be formed directly onto a tire carcass by, for example, extrusion and then cured in a mold.

The invention is further illustrated by the following examples, which are to be regarded only as illustrations and not delimitative of the invention in any way. The properties of the compositions disclosed in the examples were evaluated as described below and these utilized methods are suitable for measurement of the claimed properties of the claimed invention.

Modulus of elongation (MPa) was measured at 10% (MA10) at a temperature of 23° C. based on ASTM Standard D412 on dumb bell test pieces. The measurements were taken in the second elongation; i.e., after an accommodation cycle. These measurements are secant moduli in MPa, based on the original cross section of the test piece.

The elongation property was measured as elongation at break (%) and the corresponding elongation stress (MPa), which was measured at 23° C. in accordance with ASTM Standard D412 on ASTM C test pieces.

Mooney viscosity (ML 1+4) was measured in accordance with ASTM Standard D1646-04. In general, the composition in an uncured state is molded in a cylindrical enclosure and heated to 100° C. After 1 minute of preheating, the rotor turns within the test sample at 2 rpm, and the torque used for maintaining this movement is measured after 4 minutes of rotation. The Mooney viscosity is expressed in "Mooney units" (MU, with 1 MU=0.83 Newton-meter).

Hysteresis losses (HL) were measured in percent by rebound at 60° C. at the sixth impact in accordance with the following equation:

$$HL\ (\%) = 100(W_0 - W_1)/W_1,$$

where $W_0$ is the energy supplied and $W_1$ is the energy restored.

Dynamic properties (Tg and G*) for the rubber compositions were measured on a Metravib Model VA400 ViscoAnalyzer Test System in accordance with ASTM D5992-96. The response of a sample of vulcanized material (double shear geometry with each of the two 10 mm diameter cylindrical samples being 2 mm thick) was recorded as it was being subjected to an alternating single sinusoidal shearing stress of a constant 0.7 MPa. and at a frequency of 10 Hz over a temperature sweep from −80° C. to 100° C. with the temperature increasing at a rate of 1.5° C./min. The shear modulus G* was captured at 60° C. and the temperature at which the max tan delta occurred was recorded as the glass transition temperature, Tg.

The mole percent of the epoxide functional group was determined by NMR characterization. First a 25 mg sample of the epoxidized elastomer is dissolved in 1 mL of deuterated chloroform (CDCl$_3$). The NMR analyses were performed on a 500 MHz Bruker Spectrometer equipped with a 5 mm Broad Band Cryoprobe. The sequence used was a quantitative 30 degrees $^1$H simple impulsion with a recycle delay of 5 seconds. The spectral width was 12 ppm and the number of scans was 64. Calibration was carried out at 7.20 ppm on the CHCl$_3$ signal. Acquisition parameters were adjusted to obtain a full spectrum without HD truncation.

The $^1$H NMR Spectrum shows the characteristic signal of the CH═CH of BR1-4 ($\delta$=5.32 ppm) and the CH—CH of epoxidized BR1-4 ($\delta$=2.86 pm). A small signal at 2.63 ppm is also attributed to epoxidized BR. These attributions were confirmed by 2D NMR $^1$H-$^{13}$C HSQC and HMBC.

The $^1$H NMR spectrum makes it possible to quantify the functional group by integration of the signal characteristic of the protons of the epoxidized group situated in the vicinity of $\delta$=2.86 ppm. The $^1$H NMR technique was used to determine the microstructure of the elastomers obtained.

The molar ratio was estimated with the ratio of each pattern on the total according to the following calculation:

$$\% \ Epox = \frac{1H(Epox)}{1H(BR1-4) + 1H(Epox)}.$$

Example 1

Comparative rubber compositions were prepared using the components shown in Table 2. The amount of each component making up the rubber compositions shown in Table 2 are provided in parts per hundred parts of rubber by weight (phr). The percent epoxidation of the rubber component is also shown in Table 2 as either 5 mol % or 12.5 mol %.

The silica was Sil160 from Rhodia. The C30 was NOVARES C30 (coumarone-indene resin; softening point: 20 to 30° C.) from Rutgers Chemicals. Dertophene H150 was a terpene phenolic resin from DRT having a softening point of 118° C. and hydroxyl value of between 135-150. The SYLVARES TP2040 was a terpene phenolic resin with a softening point of 125° C., a Tg of 74° C., a hydroxyl value of between 141-160, an Mn of 608 and an Ip of 1.3.

The HTO was the sunflower oil AGRI-PURE 80 having a high oleic acid content of between 70 wt % and 80 wt %, available from Cargill.

TABLE 2

Formulations and Properties

|  | W1 | W2 | W3 |
| --- | --- | --- | --- |
| Formulations |  |  |  |
| eBR 5 mol % | 100 |  |  |
| eBR 12.5 mol % |  | 100 | 100 |
| N234 | 6.56 | 8.56 | 8.56 |
| Sil160 | 104 | 100 | 100 |
| Si69 coupling agent | 8.32 | 8 | 8 |
| C30 | 22 |  |  |
| TP2040 | 51 |  | 63 |
| Dertophene H150 |  | 73 |  |
| HTO |  |  | 10 |
| 6PPD | 2 | 1.9 | 1.9 |
| Wax | 1.5 | 1.5 | 1.5 |
| DPG | 1.7 | 1.7 | 1.7 |
| SAD | 2 | 2 | 2 |
| ZnO | 1.5 | 1.5 | 1.5 |
| CBS | 3.86 | 3.86 | 3.86 |
| S | 0.83 | 0.83 | 0.83 |
| Physical Properties |  |  |  |
| Tg, ° C. | −19 | −8 | −22 |
| G* at 60° C. | 1.1 | 1.8 | 2.3 |

The rubber formulations were prepared by mixing the components given in Table 2, except for the accelerators and sulfur, in a Banbury mixer until a temperature of between 1.10° C. and 190° C. was reached. The accelerators and sulfur were added in the second phase on a mill. Vulcanization was effected at 150° C. for 40 minutes. The formulations were then tested to measure their properties, the results of which are shown in Table 2.

Example 2

This example provides a procedure for making epoxidized BR. A solution of BR at 5 wt % in toluene was prepared by dissolving 8.4 kg of BR in 175.3 L of toluene. 809.8 g of formic acid (purity>98%) was added in the reactor under a sustained stirring. The reactor was then heated up to 50° C. After the temperature was reached, 2.12 L of H$_2$O$_2$ solution (solution at 35 wt % in water) was added to the reaction mixture. The temperature was kept at 50° C. during 4 hours at a stirring of 200 RPM.

At the end of the reaction; the temperature was decreased to 30° C. Then, formic acid was neutralized with a NaOH solution at 2.5M (1.01 eq) to obtain a pH of around 10. The contact time for the neutralization was at least 30 minutes.

Antioxidants (4,4'-methylene-bis-2,6-tort-butylphenol/N-(1,3-dimethylbutyl)-N'-phenyl-p-phenylenediamine: 1/1) are were added to the epoxidized BR solution at a rate of 0.5 g for 100 g of elastomer. The contact time was at least 15 minutes. After, the epoxidized BR solution was stripped and dried.

The epoxide quantity, as obtained by NMR as described above, is 12.5 mol %+/−0.5 mol %. The yield of the chemical modification is 95 wt %. The macrostructure of the epoxidized BR is the following: Mn=232940 g/mol; Mw=533348 g/mol and Ip=2.29 as determined by SEC as described above.

Example 3

This example demonstrates the improvements in the physical properties of rubber compositions that include the monohydroxysilane polysulfide silica coupling agent in place of the typical TESPT coupling agent.

Rubber compositions were prepared using the components shown in Table 3. The amount of each component making up the rubber compositions shown in Table 3 are provided in parts per hundred parts of rubber by weight (phr). The BR rubber used in the formulations as one having 12.5 mole % epoxidation. The silica was Sil160 from Rhodia and the SYLVARES TP2040 was a terpene phenolic resin with a softening point of 125° C., a. Tg of 74° C., a hydroxyl value of between 141 and 160, an Mn of 608 and an Ip of 1.3. The silol coupling agent was bis(3-hydroxydimethylsilyl)propyl tetrasulfide.

The rubber formulations were prepared by mixing the components given in Table 3, except for the accelerators and sulfur, in a Banbury mixer until a temperature of between 110° C. and 190° C. was reached. The accelerators and sulfur were added in the second phase on a mill. Vulcanization was effected at 150° C. for 40 minutes. The formulations were then tested to measure their properties, the results of which are shown in Table 3.

TABLE 3

Formulations and Properties

|  | W1 | W4 | F1 | F2 |
|---|---|---|---|---|
| Formulations | | | | |
| eBR 5.5 mol % | 100 | | | 100 |
| eBR 12.5 mol % | | 100 | 100 | |
| N234 | 6.56 | 8.56 | 8.56 | 6.56 |
| Sil160 | 104 | 100 | 100 | 104 |
| Si69 coupling agent | 8.32 | 8 | 0 | 0 |
| Silol | 0 | 0 | 6.25 | 6.25 |
| TP2040 | 51 | 83 | 83 | 54 |
| C30 | 22 | | | 11 |
| 6PPD | 2 | 1.9 | 1.9 | 2 |
| Wax | 1.5 | 1.5 | 1.5 | 1.5 |
| DPG | 1.7 | 1.7 | 1.7 | 1.7 |
| SAD | 2 | 2 | 2 | 2 |
| ZnO | 1.5 | 1.5 | 1.5 | 1.5 |
| CBS | 3.86 | 3.86 | 3.86 | 3.86 |
| S | 0.83 | 0.83 | 0.83 | 0.83 |
| Physical Properties | | | | |
| Tg, ° C. | −19 | 0 | 4 | −14 |
| G* at 60° C. | 1.1 | 1.5 | 1.3 | 1.3 |
| Elongation at Break % | 360 | 400 | 620 | 680 |
| Stress at Break, MPa | 7 | 19 | 28 | 24 |

Comparisons between the samples W4 and F1 of Table 3 and between W1 and F2 of Table 3 demonstrate the improvement to the elongation properties of the rubber compositions that include the silol coupling agent over those that include the TESPT coupling agent.

Example 4

This example demonstrates the much improved wear that is realized with tires having the silol coupling agent as compared to those having the typical TESPT coupling agent. Tires (205/55 R16) were manufactured using the rubber compositions of F1 shown in Example 1 and S2 shown in Example 2. The tires were mounted on cars that were driven for 10,000 miles on public roads. The difference between the tread depth of the new tire and the tread depth measured after the tire had traveled 10,000 was a measurement of tread wear. As is shown in Table 4, where the results have been normalized, the tire having the tread manufactured from the rubber composition having the silol coupling agent had 12% less wear than the tire having the TESPT coupling agent.

TABLE 4

Tread Wear

|  | Wear |
|---|---|
| Tire with F1 Tread, | 100 |
| Tire with S2 Tread | 88 |

The terms "comprising," "including," and "having," as used in the claims and specification herein, shall be considered as indicating an open group that may include other elements not specified. The term "consisting essentially of," as used in the claims and specification herein, shall be considered as indicating a partially open group that may include other elements not specified, so long as those other elements do not materially alter the basic and novel characteristics of the claimed invention. The terms "a," "an," and the singular forms of words shall be taken to include the plural form of the same words, such that the terms mean that one or more of something is provided. The terms "at least one" and "one or more" are used interchangeably. The term "one" or "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (not required) feature of the invention. Ranges that are described as being "between a and b" are inclusive of the values for "a" and "b."

It should be understood from the foregoing description that various modifications and changes may be made to the embodiments of the present invention without departing from its true spirit. The foregoing description is provided for the purpose of illustration only and should not be construed in a limiting sense. Only the language of the following claims should limit the scope of this invention.

What is claimed is:

1. A rubber composition that is based upon a cross-linkable elastomer composition, the cross-linkable elastomer composition comprising, per 100 parts by weight of rubber (phr):
   between 70 phr and 100 phr of an epoxidized rubber component selected from an epoxidized polybutadiene rubber (eBR), an epoxidized styrene-butadiene rubber (eSBR), or combinations thereof, wherein the epoxidized rubber component has a Tg of between −80° C. and −110° C. and an epoxy-function content of between 1 mol % and 25 mol %;
   between 30 phr and 150 phr of a plasticizing resin;
   silica; and
   a coupling agent that is a monohydroxysilane polysulfide having a form

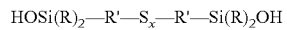
$HOSi(R)_2—R'—S_x—R'—Si(R)_2OH$

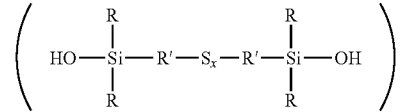

wherein radicals R, identical or different, are hydrocarbon groups, radicals R', identical or different, are divalent linking groups and x is equal to or greater than 2.

2. The rubber composition of claim 1, wherein the epoxidized rubber component is the eBR.

3. The rubber composition of claim 1, wherein the epoxidized rubber component is the eSBR.

4. The rubber composition of claim 1, wherein the radicals R are selected from $C_1$-$C_3$ alkyls and the radicals R' are selected from $C_1$-$C_4$ alkylene and x is between 2 and 4.

5. The rubber composition of claim 1, wherein the coupling agent is selected from bis(3-hydroxydimethylsilyl) propyl tetrasulfide, bis(3-hydroxydimethylsilyl)propyl disulfide, bis(2-hydroxy-dimethylsilyl)ethyl tetrasulfide, bis(2-hydroxydimethylsilyl)ethyl disulfide, or combinations thereof.

6. The rubber composition of claim 5, wherein the coupling agent is bis(3-hydroxydimethylsilyl)propyl tetrasulfide.

7. The rubber composition of claim 1, wherein the rubber composition comprises between 40 phr and 180 phr of the silica.

8. The rubber composition of claim 1, wherein the rubber composition includes less than 15 phr of carbon black.

9. The rubber composition of claim 1, wherein the rubber composition comprises between 80 phr and 100 phr of the epoxidized rubber component.

10. The rubber composition of claim 1, wherein the plasticizing resin is a terpene phenolic resin.

11. The rubber composition of claim 1, wherein a Tg of the rubber composition is between 0° C. and −35° C.

12. The rubber composition of claim 1, wherein the rubber composition further comprises between 0 phr and 10 phr of a highly unsaturated diene elastomer and between 90 phr and 100 phr of the epoxidized rubber component.

13. The rubber composition of claim 12, wherein the rubber composition comprises 100 phr of the epoxidized rubber component.

14. A tire tread, comprising the rubber composition of claim 1.

15. The rubber composition of claim 2, wherein the coupling agent is selected from bis(3-hydroxydimethylsilyl)propyl tetrasulfide, bis(3-hydroxydimethylsilyl)propyl disulfide, bis(2-hydroxy-dimethylsilyl)ethyl tetrasulfide, bis(2-hydroxydimethylsilyl)ethyl disulfide, or combinations thereof.

16. The rubber composition of claim 2, wherein the coupling agent is bis(3-hydroxydimethylsilyl)propyl tetrasulfide.

17. The rubber composition of claim 3, wherein the coupling agent is selected from bis(3-hydroxydimethylsilyl)propyl tetrasulfide, bis(3-hydroxydimethylsilyl)propyl disulfide, bis(2-hydroxy-dimethylsilyl)ethyl tetrasulfide, bis(2-hydroxydimethylsilyl)ethyl disulfide, or combinations thereof.

18. The rubber composition of claim 3, wherein the coupling agent is bis(3-hydroxydimethylsilyl)propyl tetrasulfide.

19. The rubber composition of claim 16, wherein the plasticizing resin is a terpene phenolic resin.

20. The rubber composition of claim 18, wherein the wherein the plasticizing resin is a terpene phenolic resin.

* * * * *